US008989182B2

(12) United States Patent
Bao et al.

(10) Patent No.: US 8,989,182 B2
(45) Date of Patent: Mar. 24, 2015

(54) PROVIDING A VIRTUAL DOMAIN NAME SYSTEM (DNS) IN A LOCAL AREA NETWORK (LAN)

(75) Inventors: Sheng Hua Bao, Beijing (CN); Jian Chen, Beijing (CN); Wei Jiang, Beijing (CN); Zhong Su, Beijing (CN); Xin Ying Yang, Beijing (CN); Jian Wei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 13/277,587

(22) Filed: Oct. 20, 2011

(65) Prior Publication Data

US 2012/0106548 A1 May 3, 2012

(30) Foreign Application Priority Data

Oct. 29, 2010 (CN) .......................... 2010 1 0532082

(51) Int. Cl.
*H04L 12/56* (2006.01)
*H04L 29/12* (2006.01)
(52) U.S. Cl.
CPC .... *H04L 29/12028* (2013.01); *H04L 29/12066* (2013.01); *H04L 61/103* (2013.01); *H04L 61/1511* (2013.01); *H04L 29/12226* (2013.01); *H04L 61/2015* (2013.01)
USPC ....................................... 370/390
(58) Field of Classification Search
CPC ................................. H04L 61/1511
USPC ....................................... 370/390
See application file for complete search history.

(56) References Cited

U.S. PATENT DOCUMENTS

| 7,623,518 | B2 | 11/2009 | Faulk, Jr. | |
| 7,853,720 | B2 * | 12/2010 | Choi et al. | 709/245 |
| 2009/0276713 | A1 * | 11/2009 | Eddy | 715/733 |

FOREIGN PATENT DOCUMENTS

| CN | 1564539 A | 1/2005 |
| WO | 02063474 A1 | 8/2002 |

OTHER PUBLICATIONS

Chinese Office Action for Chinese Application No. 20101053208.6, Mailed Feb. 7, 2014, 9 pages.

* cited by examiner

*Primary Examiner* — Dang Ton
*Assistant Examiner* — Kevin Lee
(74) *Attorney, Agent, or Firm* — Cantor Colburn LLP; Prentiss Johnson

(57) ABSTRACT

A terminal that includes a transmitter, a receiver, and an updater. The transmitter is configured to broadcast a first data packet in response to the terminal being connected to a local area network (LAN). The first data packet includes at least one of an Internet protocol (IP) address and a media access control (MAC) address of the terminal as well as a domain name of the terminal. The receiver is configured to receive a second data packet broadcasted by another terminal on the LAN. The second data packet includes at least one of an IP address and a MAC address of the other terminal as well as a domain name of the other terminal. The updater is configured to update a domain name system (DNS) configuration in the terminal based on the second data packet received by the receiver.

23 Claims, 6 Drawing Sheets

| Domain Name | IP |
|---|---|
| DERRY.SUBCOM.COM | 192.168.1.121 |

Fig. 2

| Domain Name | MAC |
|---|---|
| DERRY.SUBCOM.COM | 00-21-5C-7B-B4-23 |

Fig. 3

| Domain Name | IP | MAC |
|---|---|---|
| DERRY.SUBCOM.COM | 192.168.1.121 | 00-21-5C-7B-B4-23 |

Fig. 4

| Domain Name | IP | MAC |
|---|---|---|
| DERRY.SUBCOM.COM | 192.168.1.121 | 00-21-5C-7B-B4-23 |
| BAOSH.SUBCOM.COM | 192.168.1.231 | 1C-32-46-43-E2-02 |

Fig. 5

PROVIDING A VIRTUAL DOMAIN NAME SYSTEM (DNS) IN A LOCAL AREA NETWORK (LAN)

PRIORITY

This application claims priority to Chinese Patent Application No. 201010532082.6, filed on 29 Oct. 2010, and all the benefits accruing therefrom under 35 U.S.C. §119, the contents of which are herein incorporated by reference in its entirety.

BACKGROUND

The present invention generally relates to the updating of a domain name system (DNS) configuration, and more specifically, to updating a DNS configuration in a local area network (LAN).

Nowadays, there is an overwhelming growth of network users with many usages such as uploading, downloading, telecommunicating distributed information and more advanced professional distributed computing, etc. Many LANs are built in social organizations such as companies and colleges for sharing local resources and establishing distributed computation. In a modern information-explosion society, such network infrastructures are working everyday everywhere to accomplish many computation tasks.

A LAN may often suffer some hardware or manmade issues that may cause the whole LAN or certain LAN members to reboot frequently. When a LAN member reboots, either a static Internet protocol (IP) address or a dynamic IP address may be assigned to the LAN member that is being rebooted.

As for the static IP address, an IP address is fixedly assigned to a terminal apparatus or other LAN member. When the terminal apparatus reboots, its IP address is unchanged. However, this manner of assigning IP addresses does not efficiently use limited IP resources. In addition, even a static IP address may be changed after network reconfiguration.

In the case of the dynamic IP address, an IP address is only assigned to an apparatus actively connected to the network. For example, the dynamic host configuration protocol (DHCP) allows enterprises and Internet service providers (ISPs) to automatically assign an address to a computer when it is powered-on. This helps to save usable address space since not all apparatuses are actively used at any one time and they may be assigned with IP addresses as needed.

Regardless of which manner is used to assign an IP address, when a rebooted terminal apparatus has a new IP address that is different from its original IP address, this will cause reconnection failures in distributed programs and will also cause a lot of efforts to establish new recognition between LAN members. Common solutions for this are to manually obtain a new IP address, or to acquire a new IP address of a terminal apparatus by searching, for example, a hostname or description thereof. However, these solutions have a risk of mismatching since all the related information is not constant.

Of course, a centralized DNS server can be used to perform refreshing of IP addresses and to convert between an IP address and a domain name. However, it is expensive to dispose a DNS server in LAN environment.

SUMMARY

An embodiment is a terminal that includes a transmitter configured to broadcast a first data packet in response to the terminal being connected to a local area network (LAN). The first data packet includes at least one of an Internet protocol (IP) address and a media access control (MAC) address of the terminal as well as a domain name of the terminal. The terminal also includes a receiver configured to receive a second data packet broadcasted by an other terminal on the LAN. The second data packet includes at least one of an IP address and a MAC address of the other terminal as well as a domain name of the other terminal. The terminal further includes an updater configured to update a domain name system (DNS) configuration in the terminal based on the second data packet received by the receiver.

Another embodiment is a method of providing a virtual DNS in a LAN. The method includes broadcasting, by a first terminal, a first data packet in response to the first terminal being connected to the LAN. The first data packet includes at least one of an IP address and a MAC address of the first terminal as well as a domain name of the first terminal. The method also includes receiving, by the first terminal, a second data packet transmitted from a second terminal on the LAN that received the first data packet. The second data packet includes at least one of an IP address and a MAC address of the second terminal as well as a domain name of the second terminal. A DNS configuration in the first terminal is updated based on the received second data packet.

Another embodiment is a computer program product for providing a virtual DNS in a LAN. The computer program product includes a computer readable storage medium having computer readable code embodied therewith. The computer readable program code includes computer readable program code configured to broadcast a first data packet in response to a first terminal being connected to the LAN. The first data packet includes at least one of an IP address and a MAC address of the first terminal as well as a domain name of the first terminal. The computer readable program code is also configured to receive a second data packet transmitted from a second terminal on the LAN that received the first data packet. The second data packet includes at least one of an IP address and a MAC address of the second terminal as well as a domain name of the second terminal. The computer readable program code is further configured to update a DNS configuration in the first terminal based on the received second data packet.

A further embodiment is a method of providing a virtual DNS in a LAN. The method includes receiving, by a second terminal connected to the LAN, a first data packet broadcasted by a first terminal newly connected to the LAN. The first data packet includes at least one of an IP address and a MAC address of the first terminal as well as a domain name of the first terminal. The method also includes transmitting, by the second terminal, a second data packet to the first terminal in response to receiving the first data packet. The second data packet includes at least one of an IP address and a MAC address of the second terminal as well as a domain name of the second terminal. The method further includes updating a DNS configuration in the second terminal based on the received first data packet.

A further embodiment is a computer program product for providing a virtual DNS in a LAN. The computer program product includes a computer readable storage medium having computer readable code embodied therewith. The computer readable program code includes computer readable program code configured to receive a first data packet broadcasted by a first terminal newly connected to the LAN. The first data packet includes at least one of an IP address and a MAC address of the first terminal as well as a domain name of the first terminal. The computer readable program code is also configured to transmit a second data packet to the first terminal in response to receiving the first data packet. The second data packet includes at least one of an IP address and a MAC address of a second terminal as well as a domain name of the second terminal. The computer readable program code is further configured to update a DNS configuration in the second terminal based on the received first data packet.

BRIEF DESCRIPTION OF THE SEVERAL VIEWS OF THE DRAWINGS

The drawings referenced in the present application are only used to exemplify typical embodiments of the present invention and should not be considered to be limiting the scope of the present invention.

FIG. 2 is an example of a structure of a data packet according to an embodiment of the present invention;

FIG. 3 is another example of a structure of a data packet according to an embodiment of the present invention;

FIG. 4 is another example of a structure of a data packet according to an embodiment of the present invention;

FIG. 5 is an example of a structure of a data packet according to an embodiment of the present invention;

DETAILED DESCRIPTION

In the following discussion, details are provided to help thoroughly understand embodiments of the present invention. It should be appreciated that any specific terms used below are only for the convenience of description, and thus embodiments of the present invention should not be limited to only use in any specific applications represented and/or implied by such terms.

Hereinafter, a hostname refers to a label assigned to an apparatus connected to a computer network for identifying the apparatus in various forms of electronic communications such as over the world wide web (WWW), email or the like. The hostname may be a simple name consisting of a single word or phrase, or may be appended to a domain name system (DNS) domain with a symbol of "." for separating the host name from the domain name. In the latter case, the hostname may also be called a domain name. In the following description, the term "hostname" is equivalent to "domain name."

Figure 1:
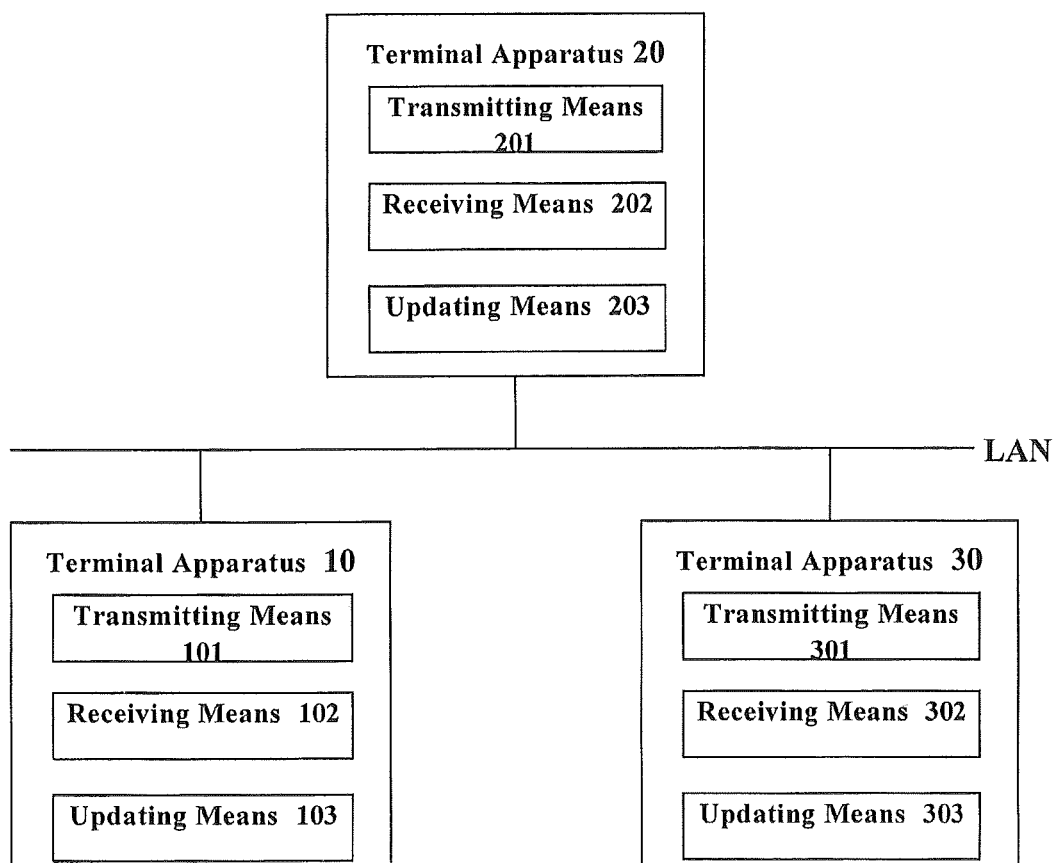
FIG. 1 is a schematic view showing a local area network (LAN) and terminals according to an embodiment of the present invention.

FIG. 1 is a schematic view showing a local area network (LAN) and terminals according to an embodiment of the present invention. FIG. 1 only shows three terminal apparatuses 10, 20 and 30 for the LAN, and the terminal apparatuses 10, 20 and 30 are in a peer-to-peer relationship in the LAN. However, it should be understood that the LAN can include any number of terminals, such as two or more than four. It is noted that the terminals as described herein include various network elements such as personal computers, servers, routers, network gates and the like.

As shown in FIG. 1, each of the terminal apparatuses 10, 20 and 30 includes a transmitting means 101, 201 and 301; a receiving means 102, 202, and 302; and an updating means 103, 203, and 303. The transmitting means is configured to broadcast a first data packet including at least one of an Internet protocol (IP) address and a media access control (MAC) address of the terminal apparatus as well as a domain name of the terminal apparatus, in response to the terminal apparatus being connected to the LAN. The receiving means is configured to receive a second data packet including at least one of an IP address and a MAC address of another terminal apparatus as well as a domain name of the other terminal apparatus, which is broadcasted by the other terminal apparatus on the LAN. The updating means is configured to update a DNS configuration in the terminal apparatus based on the second data packet received by the receiving means.

Herein, it is assumed that the terminal apparatuses 20 and 30 have been connected to the LAN, and at this time the terminal apparatus 10 is either newly joining the LAN or reconnecting to the LAN after disconnecting (both referred to hereinafter, simply called as "connecting"). In response to the terminal apparatus 10 being connected to the LAN, transmitting means 101 broadcasts a data packet on the LAN. For example, the data packet may have the structure as shown in FIG. 2, that is, a domain name and IP address pair.

Receiving means 202 and 302 of the terminal apparatuses 20 and 30 receive the data packet broadcasted by the transmitting means 101. Then, updating means 203 of the terminal apparatus 20 updates the DNS configuration in the terminal apparatus 20 based on the data packet received by the receiving means 202, and updating means 303 of the terminal apparatus 30 updates the DNS configuration in the terminal apparatus 30 based on the data packet received by the receiving means 302.

Described hereinafter, below, is how to update the DNS configurations in the terminal apparatuses.

In one embodiment of the present invention, DNS configuration refers to, for example, the "hosts" file in an operating system. It is well-known to those skilled in the art that, this file is located in the "Windows" folder in Windows 98 system, is located in the "\%Systemroot%\System32\Drivers\Etc" folder in Windows 2000/XP/Vista system (where %Systemroot% denotes the mounting path of the system), and is located in the "/etc/" folder in Linux system.

The hosts file, also referred to herein as a DNS configuration file, is actually a static text file for defining the mapping relationship between an IP address and a hostname. In the hosts file, each line is required to only include one mapping relationship, that is, an IP address and a hostname having a mapping relationship with the IP address. The hosts file has the following functions: 1) for a website that is frequently accessed, the speed of domain name resolution can be increased by configuring the mapping relationship between a hostname and an IP in the hosts file, and due to the mapping relationship, the IP can be quickly resolved without requesting the DNS server on the network; 2) generally, DNS servers are seldom built in LANs of many enterprises, so that IP addresses that are difficult to remember have to be input when other machines are accessed, however, these machines can be respectively assigned with names that are easily remembered, and mapping relationships with IPs are then built in hosts, and thus only the names that are easy to remember are input when accessing later; and 3) host names can be used to replace IP addresses in the code of distributed programs, and thus it is unnecessary to change the code just for the changing of IP addresses of object machines.

Now referring back to FIG. 1, the updating means 203 and 303 of the terminal apparatuses 20 and 30 update such hosts files based on the content of the data packet broadcasted by the terminal apparatus 10 in response to reception of the data packet. The updating means 203 and 303 add a mapping relationship containing at least one of an IP address and a MAC address of the other terminal apparatus in the received data packet, and the domain name of the other terminal apparatus in the case that a mapping relationship containing the domain name in the received data packet does not exist in the DNS configuration file. In the case that a mapping relationship containing the domain name in the received data packet exists in the DNS configuration file, the mapping relationship is updated by using the content in the received data packet.

In particular, by taking the data packet as shown in FIG. 2 as an example, if a line containing the domain name "DERRY.SUBCOM.COM" does not exist in the DNS configuration file, one line of "192.168.1.121 DERRY.SUBCOM.COM" is newly added to the DNS configuration file. If a line containing the domain name exists, the IP address of the row in the DNS configuration file that contains the host name is updated to "192.168.1.121".

The terminal apparatuses 20 and 30 obtain the mapping relationship of the IP address and the domain name of the newly connected terminal apparatus 10 through the above processes.

It is noted that the hosts file, or DNS configuration file, is only an example of the DNS configuration. In another embodiment, the DNS configuration can be a data structure customized by a user, such as a file, a database or the like. The data structure is used by a specific application. As such, a data packet broadcasted by a newly connected terminal apparatus can contain information besides an IP address and a domain name, and thus is utilized by other terminal apparatuses receiving the data packet. For example, the broadcasted data packet can also include the structure as shown in FIG. 3, including a domain name and MAC address pair, or the structure as shown in FIG. 4, including all of domain name, IP address and MAC address. By using the data packet shown in FIG. 3, a terminal apparatus receiving the data packet can update the user-customized data structure. According to the data structure, a MAC address corresponding to the domain name can be known by a specific application.

It is noted that the data packets of FIGS. 2 and 4 can be used to update the hosts file, and all of the data packets of FIGS. 2 to 4 can be used to update user-customized data structures. Since a user-customized data structure can only be used by a specific application program, the above functions 1) and 2) of updating the hosts file described as above cannot be achieved by updating the data structure only.

In another embodiment, the transmitting means of each terminal apparatus periodically broadcasts the data packet in response to the terminal apparatus being connected to the LAN. For example, referring to FIG. 1, the transmitting means 101 broadcasts the first data packet when the terminal apparatus 10 is connected to the LAN. Then, the transmitting means 101 broadcasts the first data packet at regular intervals, such as one hour or one day. As such, other terminal apparatuses connected to the LAN after the terminal apparatus 10 can also update their own DNS configurations by using the data packet broadcasted by the terminal apparatus 10.

The transmitting means 201 of the terminal apparatus 20 which has already connected to the LAN can also broadcast a data packet at regular intervals. The data packet can include at least one of an IP address and a MAC address of the terminal apparatus 20 as well as a domain name of the terminal apparatus 20. The receiving means 102 of the terminal apparatus 10 newly connected to the LAN receives the data packet broadcasted by the terminal apparatus 20, and the updating means 103 of the terminal apparatus 10 updates the DNS configuration thereof based on the data packet. Thus, the terminal apparatus 10 obtains a mapping relationship of the IP address and/or the MAC address and the domain name. In a similar way, the newly connected terminal apparatus 10 also obtains mapping relationships of IP addresses and/or MAC addresses and domain names of other terminal apparatuses in LAN, such as the terminal apparatus 30.

In another embodiment, optionally, an updating means (such as the updating means 203) of one terminal apparatus (such as the terminal apparatus 20), in response to its receiving means (such as the receiving means 202) not receiving a data packet broadcasted by other terminal apparatus (such as the terminal apparatus 10) for a predetermined period of time, deletes a record of the other terminal apparatus in the DNS configuration. For example, in the case that the DNS configuration is a hosts file, if the terminal apparatus 20 has not received the data packet broadcasted by the terminal apparatus 10 for a predetermined period of time, the terminal apparatus 20 deletes a line containing "192.168.1.121 DERRY.SUBCOM.COM" from the hosts file. Deleting this line can cause applications that are programmed by means of the hosts file to know that, the terminal apparatus 10 has been disconnected, and thus corresponding processing can be performed.

In addition, in another embodiment, in the case that a terminal apparatus has a plurality of network adapters, the data packet can include a plurality of entries. Each of the entries includes at least one of a MAC address and an IP address as well as a corresponding domain name of one of the plurality of network adapters. For example, the data packet can contain the structure shown in FIG. 5.

The data packets shown in FIGS. 2 to 5 are only illustrative examples, and these data packets can further include other fields.

Figure 6:
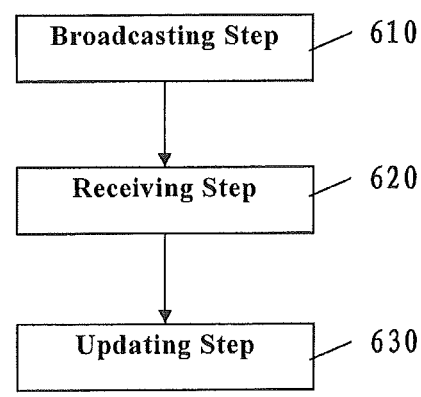
FIG. 6 is a flowchart illustrating a method of providing a virtual domain name system (DNS) in a LAN according to an embodiment of the present invention.

FIG. 6 is a flowchart illustrating a method of providing a virtual DNS in a LAN according to an embodiment of the present invention. The method is performed, for example, by the terminal apparatuses shown in FIG. 1, and includes a broadcasting block 610, a receiving block 620 and an updating block 630. In the broadcasting block 610, a first terminal apparatus 10 broadcasts a first data packet, which includes at least one of an IP address and a MAC address of the first terminal apparatus 10 as well as a domain name of the first terminal apparatus 10, in response to being connected to the LAN. In the receiving block 620, second terminal apparatuses 20, 30 in the LAN receive the first data packet broadcasted by the first terminal apparatus 10. In the updating block 630, the second terminal apparatuses 20, 30 update DNS configurations in the second terminal apparatuses 20, 30 based on the received first data packet.

In the above embodiment, the terminal apparatus connected to the LAN periodically broadcasts the data packet containing a mapping relationship of the IP address and/or the MAC address and the domain name thereof. The terminal apparatuses newly connected to the LAN can obtain mapping relationships of all other terminal apparatuses on the LAN after a certain period of time. Other mechanisms can be used to instantly obtain mapping relationships of the other terminal apparatuses.

Figure 7:
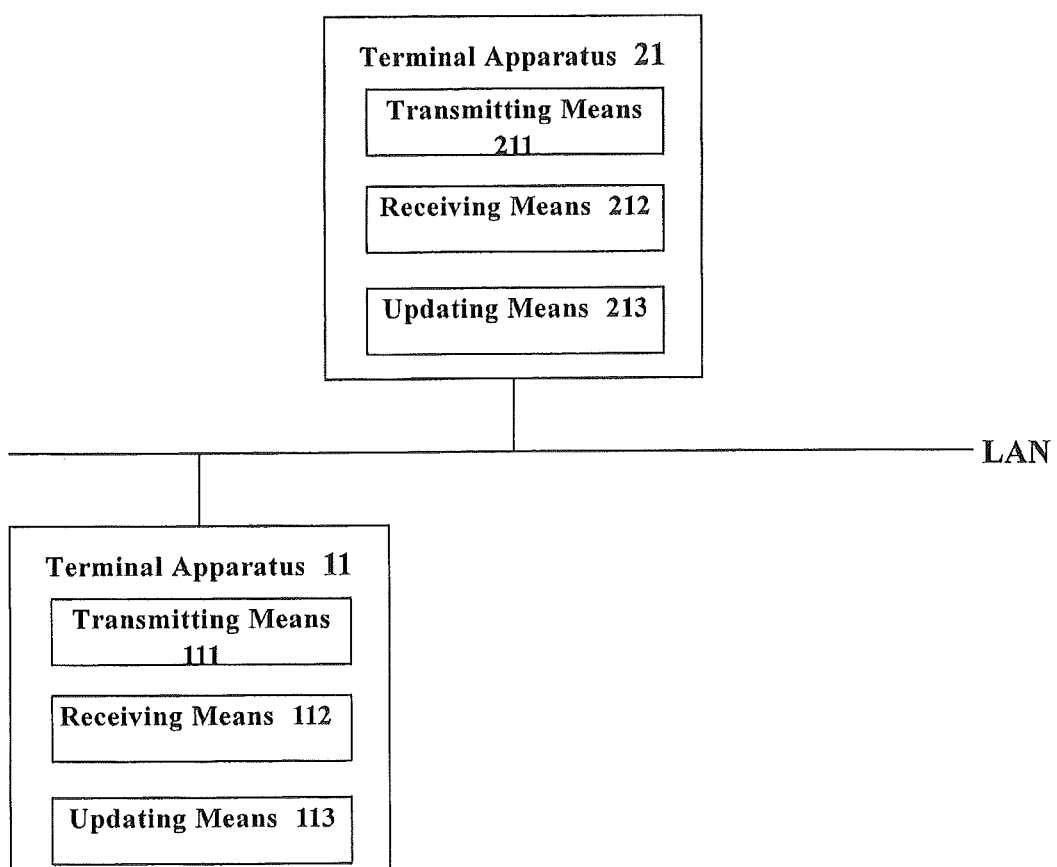
FIG. 7 is a schematic view showing a network system according to an embodiment of the present invention.

FIG. 7 is a schematic view showing a network system according to an embodiment of the present invention. Only two terminal apparatuses in a LAN are illustratively shown in FIG. 7 for simplification. It should be understood that there can be more than two terminal apparatuses in a LAN. The terminal apparatuses in FIG. 7 contain parts similar to those in the terminal apparatuses in FIG. 1, but these parts perform different functions. As shown in FIG. 7, both of the terminal apparatuses 11 and 21 includes a transmitting means 111 and 211; a receiving means 112 and 212; and an updating means 113 and 213. A method for providing a virtual DNS in a LAN and capable of instantly obtaining mapping relationships of other apparatuses is described below by first referring to a flowchart of FIG. 8.

Figure 8:
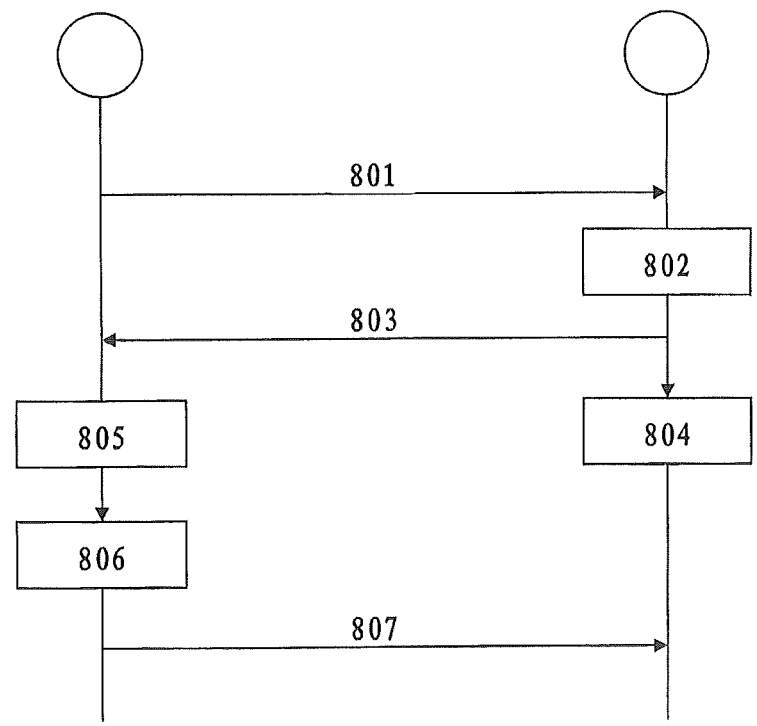
FIG. 8 is a flowchart illustrating a method of providing a virtual DNS in a LAN according to an embodiment of the present invention.

In FIG. 8, a terminal apparatus 11 broadcasts a first data packet, which includes at least one of an IP address and a MAC address of the terminal apparatus 11 as well as a domain name of the terminal apparatus 11, in response to being connected to the LAN in block 801. The first data packet can have a structure such as that shown in one of FIGS. 2 to 5, for example. In addition, the first data packet can further include a flag bit for controlling a dialog, which indicates whether the data packet is a broadcasted data packet that initiates the dialog or a confirmation data packet for receiving the broadcasted data packet (the flag will be described in detail later). In block 802, a terminal apparatus 21 receives the first data packet broadcasted by the terminal apparatus 11. In block 803, the terminal apparatus 21 transmits a second data packet including at least one of an IP address and a MAC address of the terminal apparatus 21 as well as a domain name of the terminal apparatus 21, to the terminal apparatus 11, in response to reception of the first data packet. The second data packet may have a structure such as that shown in one of FIGS. 2 to 5, for example. In addition, the second data packet can further include a flag bit.

For example, the flag bit in the first data packet can be set as a first value (for example, 0), so that the terminal apparatus 21 receiving the first data packet can know that the first data packet is a broadcasted data packet that initiates the dialog shown as in FIG. 8. That is, the data packet is a request for the exchange of mapping relationships. Correspondingly, for example, the flag bit in the second data packet can be set as a second value (for example, 1), so that the terminal apparatus 11 receiving the second data packet can know that the second data packet is a response to the first data packet and that the first data packet has been successfully received by the terminal apparatus (that is, the terminal apparatus 21) indicated by the second data packet.

Instead of flag bits, other mechanisms can be used to implement confirmation on reception of the data packet. For example, the second data packet can further contain the content of the first data packet, in addition to its own content, to indicate a confirmation on reception of the first data packet.

Now referring back to FIG. 8, in block 804, the terminal apparatus 21 updates the DNS configuration in the terminal apparatus 21 based on the received first data packet as described above. It should be noted that the performing order of the blocks 803 and 804 can be reversed or they can be performed in parallel.

In block 805, the terminal apparatus 11 receives a second data packet transmitted by the terminal apparatus 21. In block 806, the terminal apparatus 11 updates the DNS configuration in the terminal apparatus 11 based on the received second data packet as described above.

Additionally, an optional block 807 is further included in FIG. 8. In block 807, the terminal apparatus 11 sends a third data packet to the terminal apparatus 21 for confirming the reception of the second data packet in response to reception of the second data packet. The third data packet has the same structure and content as the first data packet, but its flag bit is for example set as a third value (for example, 2). Thus, the terminal apparatus 11 receiving the third data packet can know that the third data packet is a response to the second data packet and that the second data packet has been successfully received by the terminal apparatus (that is, the terminal apparatus 11) indicated by the third data packet. Confirming the reception of the second data packet is optional. It should be noted that the performing order of blocks 806 and 807 can be reversed or they can be performed in parallel.

Below, the network system in FIG. 7 is explained in detail based on the above description of the flowchart of the method in FIG. 8. The system includes at least a first terminal apparatus 11, and a second terminal apparatus 21 which is connected to a LAN. The first terminal apparatus includes: a first transmitting means 111 configured to broadcast a first data packet, which includes at least one of an IP address and a MAC address of the first terminal apparatus 11 as well as a domain name of the first terminal apparatus 11, in response to the first terminal apparatus 11 being connected to the LAN. The system also includes a first receiving means 112 configured to receive a second data packet, which includes at least one of an IP address and a MAC address of the second terminal apparatus 21 as well as a domain name of the second terminal apparatus 21, transmitted by the second terminal apparatus 21 which receives the first data packet. The system also includes a first updating means 113 configured to update a DNS configuration in the first terminal apparatus 11 based on the second data packet received by the first receiving means 112. The second terminal apparatus 21 includes: a second receiving means 212 configured to receive the first data packet broadcasted by the first terminal apparatus 11 connected to the LAN; a second transmitting means 211 configured to transmit the second data packet to the first terminal apparatus 11 in response to the second receiving means 212 receiving the first data packet; and a second updating means 213 configured to update a DNS configuration in the second terminal apparatus 21 based on the first data packet received by the second receiving means 212.

Figure 9:
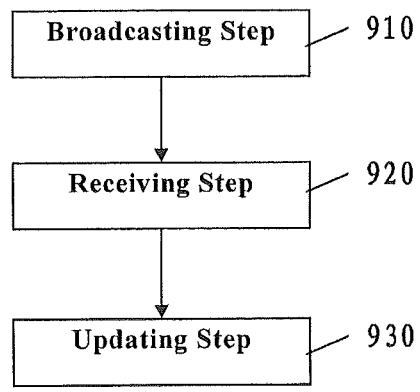
FIG. 9 is a flowchart illustrating a method of automatic DNS configuration update carried out in the first terminal of the network system shown in FIG. 7 in accordance with an embodiment of the present invention.

FIG. 9 is a flowchart illustrating a method of automatic DNS configuration update carried out in the first terminal apparatus 11 (i.e. the terminal apparatus 11 newly connected to the LAN) of the network system shown in FIG. 7. The method is performed by the first terminal apparatus, and includes at least broadcasting at block 910, receiving at block 920 and updating at block 930. In the broadcasting block 910, the first terminal apparatus 11 broadcasts a first data packet, which includes at least one of an IP address and a MAC address of the first terminal apparatus 11 as well as a domain name of the first terminal apparatus 11, in response to being connected to the LAN. In the receiving block 920, the first terminal apparatus 11 receives a second data packet, which includes at least one of an IP address and a MAC address of the second terminal apparatus 21 as well as a domain name of the second terminal apparatus 21, transmitted by the second terminal apparatus 21 on the LAN, which receives the first data packet. In the updating block 930, the first terminal apparatus 11 updates a DNS configuration in the first terminal apparatus 11 based on the received second data packet.

Figure 10:
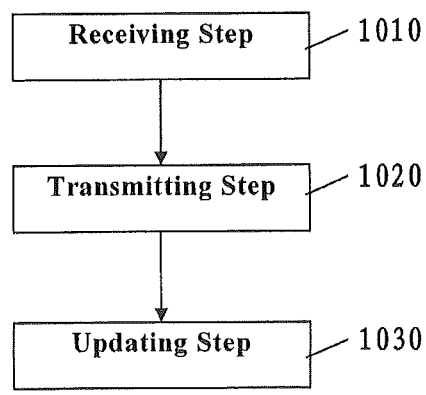
FIG. 10 is a flowchart illustrating a method of automatic DNS configuration update carried out in the second terminal of the network system shown in FIG. 7 in accordance with an embodiment of the present invention.

FIG. 10 is a flowchart illustrating a method of automatic DNS configuration update carried out in the second terminal apparatus (i.e. a terminal apparatus 21 that has connected to the LAN) of the network system shown in FIG. 7. The method is performed by the second terminal apparatus, and includes at least a receiving block 1010, a transmitting block 1020 and an updating block 1030. In the receiving block 1010, the second terminal apparatus 21 that has connected to the LAN receives a first data packet, which includes at least one of an IP address and a MAC address of the first terminal apparatus 11 as well as a domain name of the first terminal apparatus 11, broadcasted by the first terminal apparatus 11 newly connected to the LAN. In the transmitting block 1020, the second terminal apparatus 21 transmits a second data packet, which includes at least one of an IP address and a MAC address of the second terminal apparatus 21 as well as a domain name of the second terminal apparatus 21, to the first terminal apparatus 11 in response to reception of the first data packet. In the updating block 1030, the second terminal apparatus 21 updates a DNS configuration in the second terminal apparatus 21 based on the received first data packet. It should be noted that the performing order of the blocks 1020 and 1030 can be reversed or they can be performed in parallel.

In accordance with embodiments described herein, a virtual DNS can be provided in a LAN at a low resource cost so as to help to create an implementation that is transparent to the client user. Since the virtual DNS is transparent to the client, corresponding applications and interface services can be designed without being interfered by reconfiguration of other members in the LAN. In addition, embodiments of the present invention reduce maintenance work of a client/server due to the changing of network environment variance. In addition, embodiments of the present invention do not need an independent centralized DNS server, and thus the cost of building local area networks by medium and small sized enterprises is reduced.

A plurality of embodiments are described herein, those skilled in the art can combine the technical features in the above plurality of embodiments, and the technical solution thus obtained through combination also fall within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in any tangible medium of expression having computer usable program code embodied therein.

Any combination of one or more computer usable or computer readable medium(s) may be utilized. The computer usable or computer readable medium may be, for example, but not limited to, an electronic, magnetic, optical, electromagnetic, infrared, or semiconductor system, apparatus, means, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage means, a transmission medium supporting for example the Internet or Intranet, or a magnetic storage means. Note that the computer usable or computer readable medium even may be paper or other suitable medium on which programs are printed, and this is because the programs can be obtained electronically by electrically scanning the paper or other medium, and then be compiled, interpreted or processed appropriately, and be stored in a computer memory if necessary. In the context of this document, a computer usable or computer readable storage medium may be any medium that contains, stores, communicates, propagates, or transmits a program for use by or in connection with an instruction execution system, apparatus, or means. A computer useable medium may include a data signal with computer usable program code embodied therein, propagated in baseband or as part of a carrier wave. The computer usable program code may be transmitted using any appropriate medium, including but not limited to wireless, wireline, optical fiber cable, RF, etc.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the computer or other programmable data processing apparatus, create means for implementing the functions/acts specified in the blocks of the flowchart illustrations and/or block diagrams.

These computer program instructions may also be stored in a computer readable medium that can direct a computer or other programmable data processing apparatus to function in a particular manner, such that the instructions stored in the computer readable medium produce an article of manufacture including instruction means which implement the functions/acts specified in the blocks of the flowchart illustrations and/or block diagrams.

The computer program instructions may also be loaded onto a computer or other programmable data processing apparatus to cause a series of operational steps to be performed on the computer or other programmable data processing apparatus to produce a computer implemented process such that the instructions which execute on the computer or other programmable apparatus provide processes for implementing the functions/acts specified in the blocks of the flowchart illustrations and/or block diagrams.

The flowchart illustrations and block diagrams in the figures illustrate the architecture, functionality, and operation of possible implementations of systems, methods and computer program products according to various embodiments of the present invention. In this regard, each block in the flowchart illustrations or block diagrams may represent a module, program segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable those of ordinary skill in the art to understand the invention for various embodiments with various modifications as are suited to the particular use contemplated.

What is claimed is:

1. A terminal comprising:
   a transmitter configured to broadcast a first data packet responsive to the terminal being connected to a local area network (LAN), the first data packet including at least one of an Internet protocol (IP) address and a media access control (MAC) address of the terminal as well as a domain name of the terminal, wherein the terminal was connected to the LAN as part of a terminal reboot process to reconnect the terminal to the LAN based on detecting that the terminal was previously disconnected from the LAN after having been previously connected to the LAN;
   a receiver configured to receive a second data packet broadcasted by an other terminal on the LAN, the second data packet including at least one of an IP address and a MAC address of the other terminal as well as a domain name of the other terminal; and
   an updater configured to update a domain name system (DNS) configuration in the terminal based on the second data packet received by the receiver.

2. The terminal according to claim 1, wherein the transmitter is further configured to periodically broadcast the first data packet while the terminal is connected to the LAN.

3. The terminal according to claim 1, wherein the DNS configuration is one of a hosts file in an operating system, and a data structure customized by a user and used by an application.

4. The terminal according to claim 1, wherein the updater is further configured to delete a record related to the other terminal from the DNS configuration in response to the receiver not receiving the second data packet broadcasted by the other terminal for a predetermined period of time.

5. The terminal according to claim 1, wherein the terminal includes a plurality of network adapters, and the first data packet includes a plurality of entries, each of the entries including at least one of a MAC address and an IP address as well as a corresponding domain name of one of the plurality of network adapters.

6. The terminal according to claim 1, wherein the updater is further configured to add a mapping relationship that includes at least one of the IP address and the MAC address of the other terminal as well as the domain name of the other terminal in the second data packet responsive to a determination that a mapping relationship containing the domain name in the second data packet does not exist in the DNS configuration.

7. The terminal according to claim 1, wherein the receiver is further configured to receive a third data packet transmitted by the other terminal in response to the other terminal receiving the first data packet.

8. A method of providing a virtual domain name system (DNS) in a local area network (LAN), the method comprising:
   broadcasting, by a first terminal, a first data packet in response to the first terminal being connected to the LAN, the first data packet including at least one of an Internet Protocol (IP) address and a media access control (MAC) address of the first terminal as well as a domain name of the first terminal, wherein the first terminal was connected to the LAN as part of a terminal reboot process to reconnect the first terminal to the LAN based on detecting that the first terminal was previously disconnected from the LAN after having been previously connected to the LAN;
   receiving, by the first terminal, a second data packet transmitted from a second terminal on the LAN that received the first data packet, the second data packet including at least one of an IP address and a MAC address of the second terminal as well as a domain name of the second terminal; and
   updating a DNS configuration in the first terminal based on the received second data packet.

9. The method according to claim 8, further comprising periodically broadcasting the first data packet while the first terminal is connected to the LAN.

10. The method according to claim 8, further comprising deleting a record related to the second terminal from the DNS configuration responsive to the first terminal not receiving the second data packet for a predetermined period of time.

11. The method according to claim 8, further comprising determining that a mapping relationship that includes the domain name in the second data packet does not exist in the DNS configuration, and adding a mapping relationship to the DNS configuration, the mapping relationship including the domain name of the second terminal and at least one of the IP address and the MAC address of the second terminal.

12. The method according to claim 8, further comprising transmitting, from the first terminal, a third data packet to the second terminal, the third data packet confirming receipt of the second data packet at the first terminal.

13. A computer program product for providing a virtual domain name system (DNS) in a local area network (LAN), the computer program product comprising:
- a non-transitory computer readable storage medium having computer readable code embodied therewith, the computer readable code comprising:
- computer readable program code configured to:
- broadcast a first data packet in response to a first terminal being connected to the LAN, the first data packet including at least one of an IP address and a MAC address of the first terminal as well as a domain name of the first terminal, wherein the first terminal was connected to the LAN as part of a terminal reboot process to reconnect the first terminal to the LAN based on detecting that the first terminal was previously disconnected from the LAN after having been previously connected to the LAN;
- receive a second data packet transmitted from a second terminal on the LAN that received the first data packet, the second data packet including at least one of an IP address and a MAC address of the second terminal as well as a domain name of the second terminal; and
- update a DNS configuration in the first terminal based on the received second data packet.

14. The computer program according to claim 13, wherein the computer readable program code is further configured to periodically broadcast the first data packet while the first terminal is connected to the LAN.

15. The computer program product according to claim 13, wherein the computer readable program code is further configured to delete a record related to the second terminal from the DNS configuration responsive to the first terminal not receiving the second data packet for a predetermined period of time.

16. The computer program product according to claim 13, wherein the computer readable program code is further configured to determine that a mapping relationship that includes the domain name in the second data packet does not exist in the DNS configuration, and to add a mapping relationship to the DNS configuration, the mapping relationship including the domain name of the second terminal and at least one of the IP address and the MAC address of the second terminal.

17. The computer program product according to claim 13, wherein the computer readable program code is further configured to transmit a third data packet to the second terminal.

18. A method of providing a virtual domain name system (DNS) in a local area network (LAN), the method comprising:
- receiving, by a second terminal connected to the LAN, a first data packet broadcasted by a first terminal newly connected to the LAN, the first data packet including at least one of an Internet protocol (IP) address and a media access control (MAC) address of the first terminal as well as a domain name of the first terminal, wherein the first terminal was newly connected to the LAN as part of a terminal reboot process to reconnect the first terminal to the LAN based on detecting that the first terminal was previously disconnected from the LAN after having been previously connected to the LAN;
- transmitting, by the second terminal, a second data packet to the first terminal in response to receiving the first data packet, the second data packet including at least one of an IP address and a MAC address of the second terminal as well as a domain name of the second terminal; and
- updating a DNS configuration in the second terminal based on the received first data packet.

19. The method according to claim 18, wherein the first and second data packets further include a flag bit for controlling a dialog.

20. The method according to claim 18, wherein the updating a DNS configuration includes determining that the domain name in the first data packet is not contained in the DNS configuration, and adding a mapping relationship that includes the domain name of the first terminal and at least one of the IP address and the MAC address of the first terminal.

21. A computer program product for providing a virtual domain name system (DNS) in a local area network (LAN), the computer program product comprising:
- a non-transitory computer readable storage medium having computer readable code embodied therewith, the computer readable code comprising:
- computer readable program code configured to:
- receive a first data packet broadcasted by a first terminal newly connected to a LAN, the first data packet including at least one of an Internet protocol (IP) address and a media access control (MAC) address of the first terminal as well as a domain name of the first terminal, wherein the first terminal was newly connected to the LAN as part of a terminal reboot process to reconnect the first terminal to the LAN based on detecting that the first terminal was previously disconnected from the LAN after having been previously connected to the LAN;
- transmit a second data packet to the first terminal in response to receiving the first data packet, the second data packet including at least one of an IP address and a MAC address of a second terminal as well as a domain name of the second terminal; and
- update a DNS configuration in the second terminal based on the received first data packet.

22. The computer program product of claim 21, wherein the first and second data packets further include a flag bit for controlling a dialog.

23. The computer program product of claim 21, wherein the update a DNS configuration includes determining that the domain name in the first data packet is not contained in the DNS configuration, and adding a mapping relationship that includes the domain name of the first terminal and at least one of the IP address and the MAC address of the first terminal.

* * * * *